United States Patent
Pardell et al.

(10) Patent No.: US 12,185,712 B2
(45) Date of Patent: Jan. 7, 2025

(54) LIGHT CONCENTRATION WEEDING SYSTEM

(71) Applicants: Ricard Pardell, Newport (GB); Luke Robinson, Newport (GB); David Whitewood, Newport (GB)

(72) Inventors: Ricard Pardell, Newport (GB); Luke Robinson, Newport (GB); David Whitewood, Newport (GB)

(73) Assignee: EARTH ROVER LIMITED (GB)

( * ) Notice: Subject to any disclaimer, the term of this patent is extended or adjusted under 35 U.S.C. 154(b) by 0 days.

(21) Appl. No.: 18/036,243

(22) PCT Filed: Nov. 8, 2021

(86) PCT No.: PCT/IB2021/060317
§ 371 (c)(1),
(2) Date: May 10, 2023

(87) PCT Pub. No.: WO2022/101759
PCT Pub. Date: May 19, 2022

(65) Prior Publication Data
US 2023/0413801 A1   Dec. 28, 2023

Related U.S. Application Data

(60) Provisional application No. 63/112,691, filed on Nov. 12, 2020.

(51) Int. Cl.
*A01M 21/04*   (2006.01)
*F21V 5/00*    (2018.01)
(Continued)

(52) U.S. Cl.
CPC ............ *A01M 21/04* (2013.01); *F21V 5/007* (2013.01); *F21V 5/008* (2013.01); *F21Y 2115/10* (2016.08); *F21Y 2115/30* (2016.08)

(58) Field of Classification Search
CPC .... A01M 21/04; A01M 21/00; A01M 21/104; A01B 39/18; A01B 69/008;
(Continued)

(56) References Cited

U.S. PATENT DOCUMENTS 3,652,844 A   3/1972  Scott
6,795,568 B1  9/2004  Christensen
(Continued)

FOREIGN PATENT DOCUMENTS

CN   101589705 A  * 12/2009
EP      1081819 A2 *  3/2001  ......... G02B 19/0014

*Primary Examiner* — Erin Kryukova
(74) *Attorney, Agent, or Firm* — Galbreath Law Offices, P.C.; John A. Galbreath

(57) ABSTRACT

Weeding apparatus includes a concentrator assembly having a two-dimensional array of discrete semiconductor light emitters (2), e.g. laser diodes or LEDs. A primary optical stage (3) includes collimating lenses (4) each corresponding to one of the semiconductor light emitters (2) to collimate their light and produce a compound collimated beam. A secondary optical stage (5) incorporates a lens system arranged to convert the collimated beam into a convergent beam to concentrate the emitted light at a focal position. The concentrator assembly (1) may be incorporated in a weeding unit with a mechanical drive arrangement to direct the focal position onto a selected plant. A number of such weeding units maybe incorporated in a weeding module along with a control system. The weeding modules can be carried by an autonomous rover.

18 Claims, 18 Drawing Sheets

(51) Int. Cl.
*F21Y 115/10* (2016.01)
*F21Y 115/30* (2016.01)

(58) Field of Classification Search
CPC ....... A01B 69/001; A01B 9/008; A01B 9/001; F21Y 2115/10; F21Y 2115/30; F21Y 2105/10; F21Y 2105/12; F21Y 2105/14; F21Y 2105/16; F21Y 2105/18; G02B 19/0057; G02B 19/0066; F21V 5/007; F21V 5/008
See application file for complete search history.

(56) References Cited

U.S. PATENT DOCUMENTS

| | | | |
|---|---|---|---|
| 7,875,862 B1 | 1/2011 | Hudson | |
| 9,609,859 B2 | 4/2017 | Stowe | |
| 10,226,036 B2 | 3/2019 | Guice | |
| 2009/0114210 A1* | 5/2009 | Guice | F24S 20/30 126/569 |
| 2009/0210119 A1* | 8/2009 | Poulsen | A01M 21/04 701/50 |
| 2013/0238201 A1* | 9/2013 | Redden | G06V 10/255 701/50 |
| 2015/0075067 A1* | 3/2015 | Stowe | A01D 34/835 47/1.3 |
| 2015/0075068 A1 | 3/2015 | Stowe | |
| 2016/0173837 A1* | 6/2016 | Miyata | H04N 9/3111 353/31 |
| 2016/0205917 A1* | 7/2016 | Chan | A01M 21/046 |
| 2018/0139947 A1* | 5/2018 | Albert | A01M 7/00 |
| 2020/0120917 A1* | 4/2020 | Jackson | A01M 21/04 |
| 2022/0312757 A1* | 10/2022 | Geiger | G05B 19/4155 |
| 2022/0397259 A1* | 12/2022 | Zhang | G02B 27/0961 |

* cited by examiner

LIGHT CONCENTRATION WEEDING SYSTEM

TECHNICAL FIELD OF THE INVENTION

This invention relates to weeding apparatus to manage weeds (i.e. unwanted plants) by using concentrated light to kill or at least significantly damage them.

BACKGROUND

Weeding is one of the most expensive and labour-intensive tasks in farming and gardening.

There are multiple examples in the literature of using lasers to control weeds, e.g. U.S. Pat. No. 9,609,859-B.

Using radiant energy to control weeds in a crop has many advantages over traditional weeding methods, avoiding soil disturbance and eradicating herbicides.

The prior art solutions generally use a single high-power collimated laser beam which is targeted on weeds by moving mirrors driven by galvanometers. The use of such powerful collimated beams poses great safety risks in the field deployment of such devices, the main hazard being that an undesired ground reflection from a high power and collimated beam, eventually reaching a human eye, may severely injure or completely blind a person, even at long distance.

Finding robust and simple measures to deal with this safety problem whilst fulfilling the demanding requirements of a farm environment has proven particularly challenging. One suggested method, for instance, consists in enclosing the work area within moving walls opaque to the laser beams. Such a system is cumbersome, adding many moving parts prone to failure and can physically interfere with the crop, damaging it.

Also, the reliability, longevity and cost of such single beam high power lasers are not satisfactory. Such large power for individual collimated beams requires complex light coupling techniques, active water cooling and the use of expensive and fragile lasing systems. Compounding this, the moving mirror system is prone to fast reflector surface degradation due to the incident extremely high irradiance.

All these problems of collimated laser beam weeding systems have impeded their adoption by farmers, and none of them has evolved beyond the prototype stage.

The present invention aims at improving safety, reliability, longevity, carbon footprint, soil impact, environmental sustainability and operational cost of traditional weeding systems whilst overcoming the shortcomings of single beam collimated laser systems.

SUMMARY OF THE INVENTION

When viewed from one aspect the present invention proposes weeding apparatus according to claim 1.

The proposed solution is based on the convergent concentration of light from many cheap and reliable semiconductor emitters in a two-dimensional array within a weeding concentrator assembly.

This method is inherently safe because any ground reflection of the concentrated beam would be shaped as a diffusing and diverging cone of light with homogeneous irradiance on any crossing plane.

Due to the use of multiple low power cheap semiconductor emitters, system cost and average junction temperature are reduced. Thermal management is simplified, so that air convection cooling is enough to assure a safe junction temperature, further reducing system costs. Reduced complexity and lower average junction temperature increases longevity, reliability, and robustness.

The proposed weeding concentrators may be mounted on aiming robots controlled by a computer using stereo cameras or cameras working together with lidars. The weeding concentrators and related cameras and control system may be enclosed within a water and dust tight enclosure, having a glass pane in the bottom, so that no moving parts are exposed to the elements.

Several of these modules can be mounted on an autonomous farming rover to allow a fully autonomous weeding operation, avoiding any direct labour cost.

A scouting activity may be executed by the autonomous rover in parallel with the weed control function. On each weeding pass, just by using the sensor data generated by the weeding system and enriching it with precise localisation data, a crop map can be produced at individual plant level, measuring the exact position and volume of each plant or fruit on the field, adding to this map weed density information, including weed classification.

This basic scouting function can be further enriched with additional sensors to measure crop and soil health, such as thermal cameras, multi-spectral sensors, radar, soil sampling devices, etc. so that fully automated pest and disease intelligence can be deployed.

Also, the weeding concentrators are powerful enough to be used together with spectral analysers to study soil composition, by vaporising a soil sample and then measuring the spectral response of ionized gases.

Besides this fully automated embodiment of the invention, addressed to the organic farming market, a manually operated version of the weeding concentrator is proposed, to be used by professional and hobbyist gardeners.

In the weeding concentrator multiple semiconductor emitters, such as laser diodes or LEDs (light emitting diodes), are arranged on a regular two-dimensional pattern, e.g. a square or hexagonal grid, or any other suitable regularly spaced pattern, on the same plane.

Multimode transverse laser diodes or LEDs of adequate wavelength are much preferred due to their monochromatic emission characteristics, when chosen to emit in a wavelength suited to the absorption spectrum of weeds. For instance, indium gallium nitride (InGaN) transverse multimode laser diodes emitting at 450 nm could be a good choice. Transverse single-mode laser diodes are not appropriate due to their emitting spatial distribution, as it is explained later.

Such individual semiconductor light sources are then collimated using a primary collimating optical stage, at a convenient distance from the emitter, so that the irradiance (radiant power per unit area) of each individual collimated beam is kept to a relatively low and homogeneous value.

Such collimated and homogeneous beams are then concentrated using a secondary optical stage, for instance a plano-convex lens, creating a high irradiance spot at the focal plane of the secondary optical stage.

When targeted at a weed's stem for a short period of time, the resulting concentrated irradiation (radiant energy) will kill or damage the weed.

In case of any accidental ground reflection (for instance when hitting a flat metallic item lying on the ground) the reflected beam shape will be conic and its irradiance will be reduced with the square power of the distance.

The weeding concentrator is preferably mounted on an aiming robot having three degrees of freedom (DOF), allowing the concentrator to be aimed at a target and the distance to the target adjusted to match the focal length of the concentrating secondary optical stage.

Alternatively, the weeding concentrator may incorporate a device allowing the adjustment of the distance between the primary and secondary optical stages, therefore adjusting the position of the concentrating stage to match the focal plane to the distance to the target. This version may be mounted on an aiming robot with only two degrees of freedom to aim the concentrator towards the target.

The assembly of a weeding concentrator and its aiming robot or other mechanical drive arrangement is referred to herein as a weeding unit.

The weeding method described here is expected to be executed with the weeding concentrator assembly in a static position.

Several weeding units may be controlled by one computer. The control computer is preferably connected to a camera, and using a computer vision algorithm, detects weeds in the image and calculates the position of each weed in space. Multiple sensors can be used to estimate the cartesian position of the weed, for instance through stereo vision or lidar.

The system preferably uses different levels of power for the light beam. A low-power level can be used to aim the concentrated light spot onto the weed and then a high-power level is delivered in a short time pulse to kill the weed.

For each weed detected, the system executes a visual servoing algorithm in which the aiming low-power level is used to detect the light spot on the image as a control feed-back signal for position correction.

When the aiming light spot is coincident with the initial position of the weed in the image, the system fires the high-power pulse at the weed.

One or more weeding units are preferably mounted within a water and dust tight enclosure having at least an IP65 rating, together with cameras, sensors and illumination devices. The bottom of the enclosure is closed by a glass pane. The enclosure also incorporates power and communication ports for external connection. This assembly is referred to herein as a weeding module.

Several weeding modules can be mounted in parallel and/or in series on an autonomous vehicle such as a farming rover. The modules can be powered by the vehicle batteries and arranged to communicate with a main rover computer. The rover battery can be charged by on-board high efficiency solar panels, for further operational cost reduction and carbon footprint reduction.

The autonomous farming rover will typically advance into a starting weeding position, stop, and then send a command to the multiple weeding modules to target and kill all detected weeds within the work area. When the weeding operation is finished, each weeding module will communicate this to the rover computer and, after verifying that all weeding modules have completed the weeding operation, the rover will then move towards the next weeding position.

Data coming from the weeding module sensors is preferably enriched with additional measurements from rover sensors, including a precise localisation subsystem using RTK (real time kinematics), which therefore produces very detailed information for each crop plant on the field and on weed density in the area.

To avoid accidents and improper manipulation, the weeding modules preferably incorporate electrical and electronic safety measures which will disable them if any attempt is made at dis-assembly.

The vehicle preferably incorporates sensors to detect the presence of surrounding people or animals and measure the distance towards them to ensure that the weeder only operates when vulnerable subjects are outside a minimum safety distance.

To reduce its carbon footprint, the farming rover will preferentially be powered by batteries charged by high efficiency on-board solar cells. These solar cells may be laminated onto a rover bodywork which fulfills three simultaneous functions: 1) additional weather protection of the weeding modules and rover electronics and sensors, 2) a substrate for the solar cells, and 3) an additional passive protective measure against accidental ground reflections.

The proposed manually operated version which would be aimed and triggered by a human operator, e.g. in gardening activities, may include specific safety measures.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
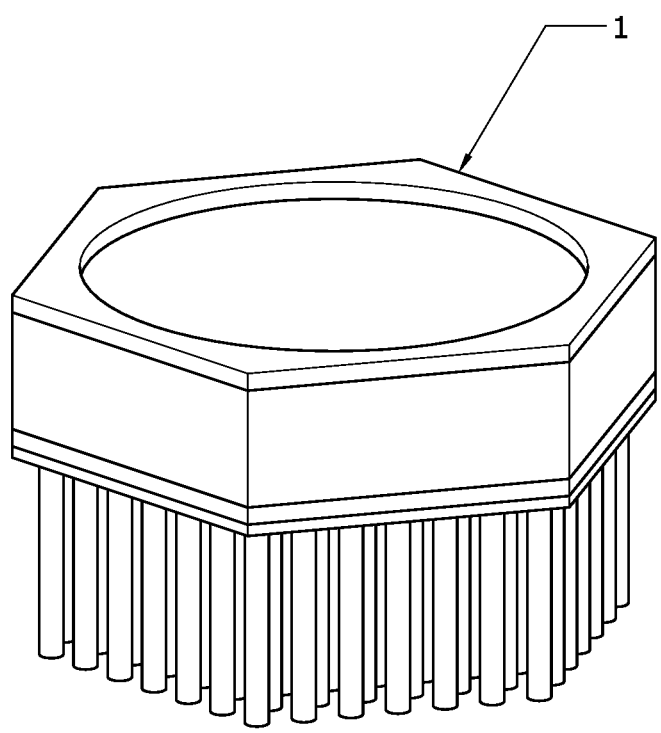
FIG. 1 is a general view of a weeding concentrator as used in weeding apparatus.
Figure 2:
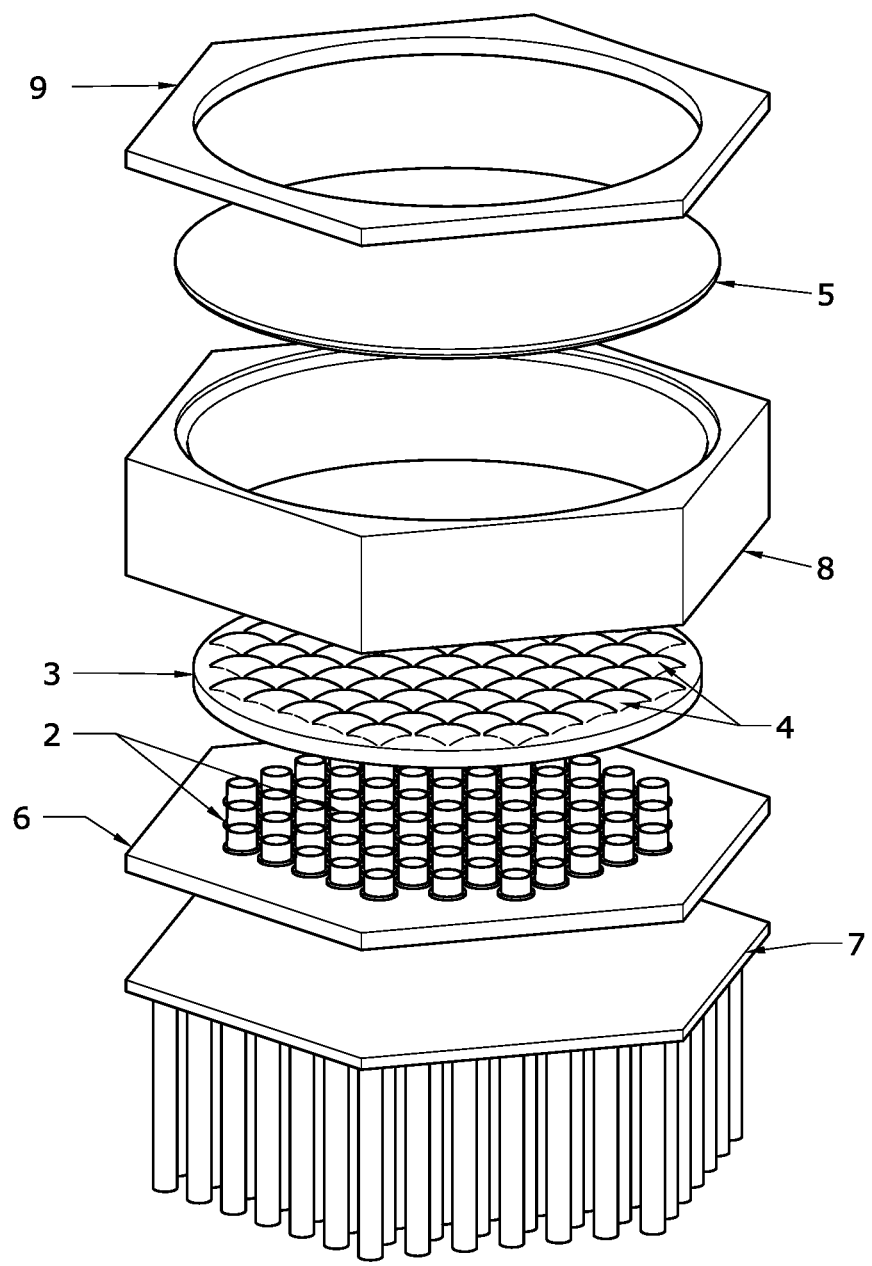
FIG. 2 is an exploded view of the weeding concentrator.

Referring to FIGS. 1 and 2, the weeding concentrator 1 comprises: a two-dimensional array of discrete semiconductor light emitters 2, mounted on a heat conductive and electrically insulating substrate 6 attached to heat sink 7; a primary optical stage 3, composed of multiple collimating lenses 4; a light-concentrating secondary optical stage 5; and mechanical components 8 and 9 to assemble all previous components.

Emitters 2 are shown arranged within a circle, on a square grid pattern, but other arrangements would be possible.

Emitters 2 can be either LEDs or laser diodes. When LEDs are chosen, they should incorporate a preliminary optical device to shape its Lambertian emission (i.e. emitted radiance which is independent of the observation direction) into a cone of light with a defined angular divergence. When laser diodes are used, there is no need for this preliminary optical stage, as the emitting spatial distribution of these devices is not Lambertian, instead emitting within a defined angular aperture, typically having different parallel and transverse beam divergences.

Figure 3:
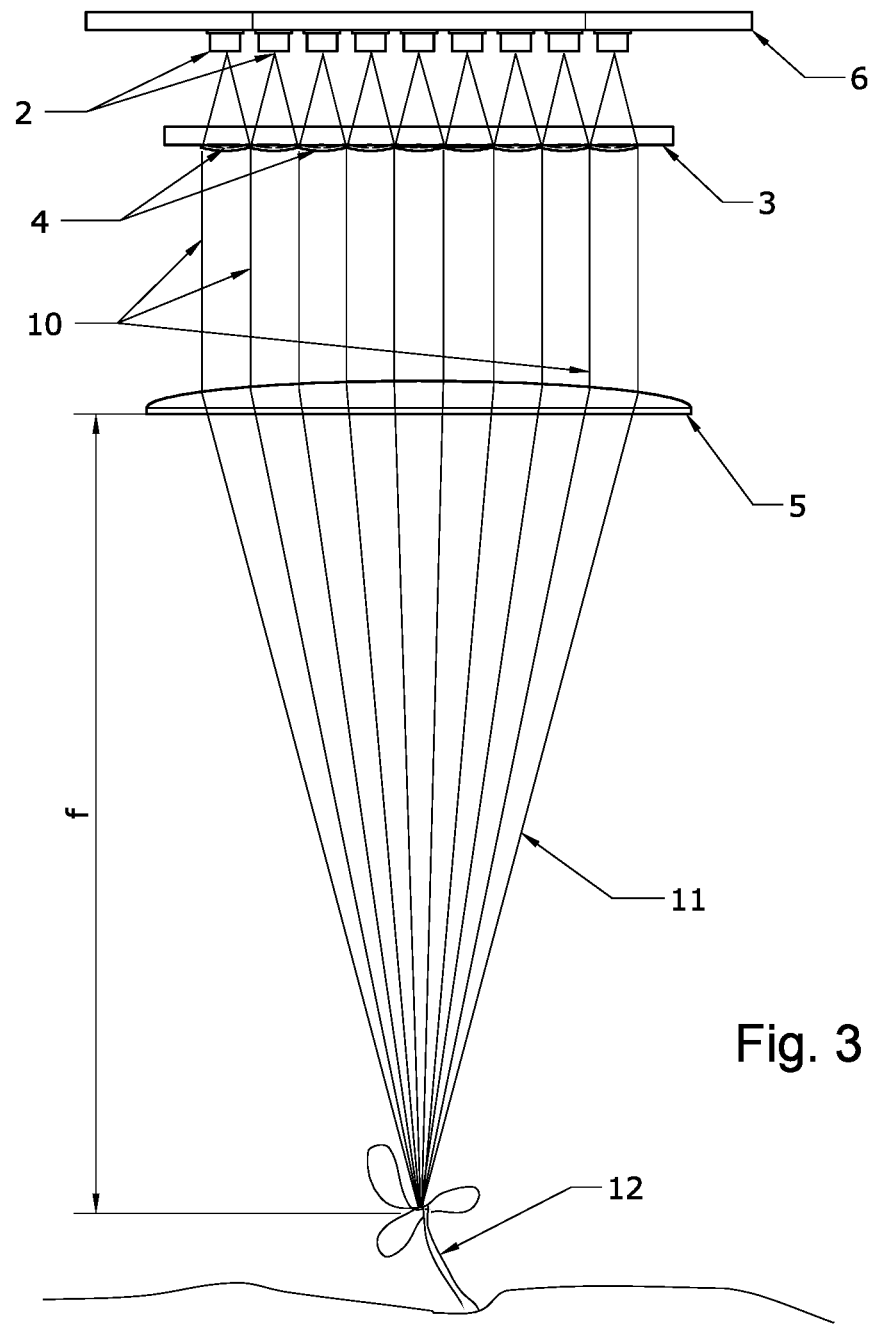
FIG. 3 is a schematic sectional view of weeding concentrator.

Referring to FIG. 3, divergent light from light emitters 2 is collimated by primary optical stage 3, each lens 4 collimating the beam from a respective emitter, such that the ensemble generates a compound collimated beam 10. The optimal arrangement would be that in which the beam aperture of each emitter 2 is coincident with each collimating lens 4 aperture, and all collimating lenses would be adjacent, in such a way as to deliver as much an homogeneous compound collimated beam 10 as possible.

Compound collimated beam 10 is concentrated by secondary optical stage 5 creating a conic beam 11 which concentrates all the emitted energy on a central spot at focal length f, to kill or damage a weed 12. This secondary optical stage can be implemented using a plano-convex lens, a Fresnel lens, or any similar optical lens system having infinite and f focal length conjugates. It is possible to design the optical system so that primary optical stage 3 and secondary optical stage 5 are effectively combined in a single optical element, for instance by combining multiple collimating lenses with a single concentrating lens.

The main objective of the invention is to deliver concentrated radiant energy on a weed 12 in as short as possible period of time, using a relatively economical, scalable and robust solution, based on multiple cheap low power solid-state emitters having characteristic emissivity on a wavelength with good absorption by the weeds, and to do this using an inherently safe method.

Figure 4:
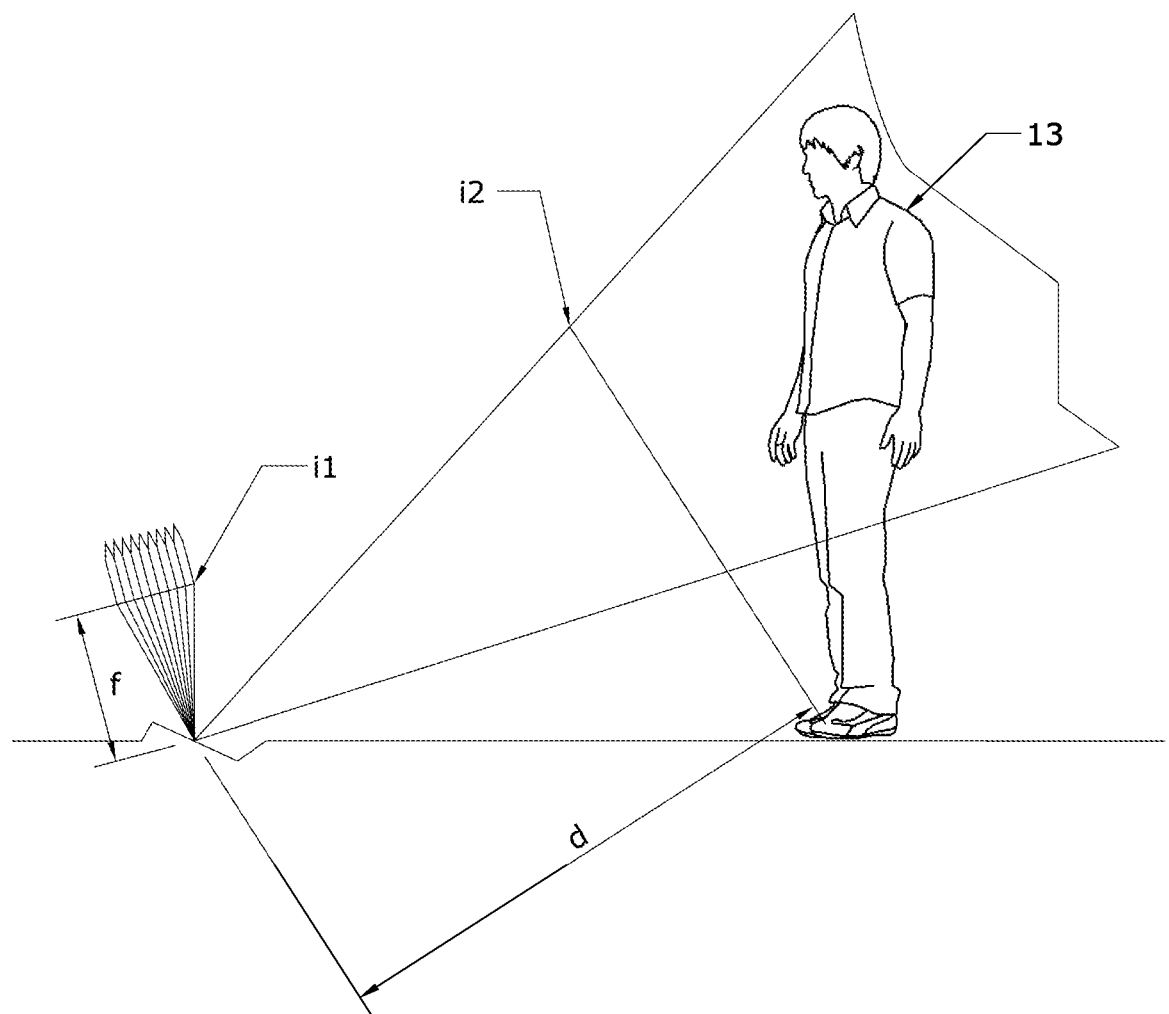
FIG. 4 is a diagrammatic illustration of the optical principle on which the weeding concentrator works.

Considering FIG. 4, a homogeneous collimated compound beam from the primary optical stage reaches the secondary optical stage at a given level of irradiance i1. The secondary optical stage concentrates the compound beam on a spot at focal length f with a very high level of irradiance that will kill or severely damage any weed within its radius. Any accidental specular reflection on the ground will create a diverging cone of light having the same divergence angle as the incident concentrated beam coming from secondary optical stage. It is easy to demonstrate that irradiance i2 on a plane crossing this reflected beam at a distance d will be divided by the square of the ratio between distance d and secondary optical stage focal length f:

$$i_2 = \frac{i_1}{(d/f)^2}$$

Experiments conducted in the development of the weeding apparatus have shown that 10 J of monochromatic 450 nm wavelength irradiation directed to a small weed meristem (<25 mm height) is more than enough to kill it.

The radiant power required to deliver that amount of energy will depend on the amount of time allowed by the operation. If for instance we have a time budget of 100 ms per weed, then the required emitting power P of the weeding concentrator must be 100 W. If the emitters are arranged within a circle having a diameter D of 100 mm, then i1 will be equal to this radiant power divided by the area covered by the compound collimated beam, so:

$$i_1 = \frac{P}{A} = \frac{P}{\pi r^2} = \frac{P}{\pi \left(\frac{D}{2}\right)^2} = \frac{100\ W}{\pi \left(\frac{0.1\ m}{2}\right)^2} = 12{,}732\ W/m^2$$

Therefore, in this case, the irradiance at the entry aperture of the secondary optical stage is equivalent to the brightness of 12.7 suns (1 sun=1,000 W/m²).

Taking a safety limit for i2 equivalent to the irradiance of the sun, and if the focal length of the secondary optical stage is 0.5 m, then the safety distance can be calculated as:

$$d = f\sqrt{\frac{i_1}{i_2}} = 0.5\ m\ \sqrt{\frac{12{,}732\ W/m^2}{1{,}000\ W/m^2}} = 1.78\ m$$

Therefore, at a distance of 1.78 m from the focal spot, the reflected irradiance in the event of hitting a specular surface on the ground would be equivalent to that of the sun, which is an irradiance level not dangerous for the eyesight for an exposure time of 100 ms. Consequently, any irradiated subject 13 keeping the safety distance will not be hurt.

To achieve this result, the irradiance distribution incident at the safety plane must be homogeneous. Due to this, the semiconductor emitter choices are limited to LEDs with a Lambertian spatial distribution, and to transverse multimode laser diodes, which irradiate multiple overlapping Gaussian beams composing a square shaped spatial distribution. Transverse single mode lasers are therefore not recommended due to its pure Gaussian spatial distribution.

Figure 5:
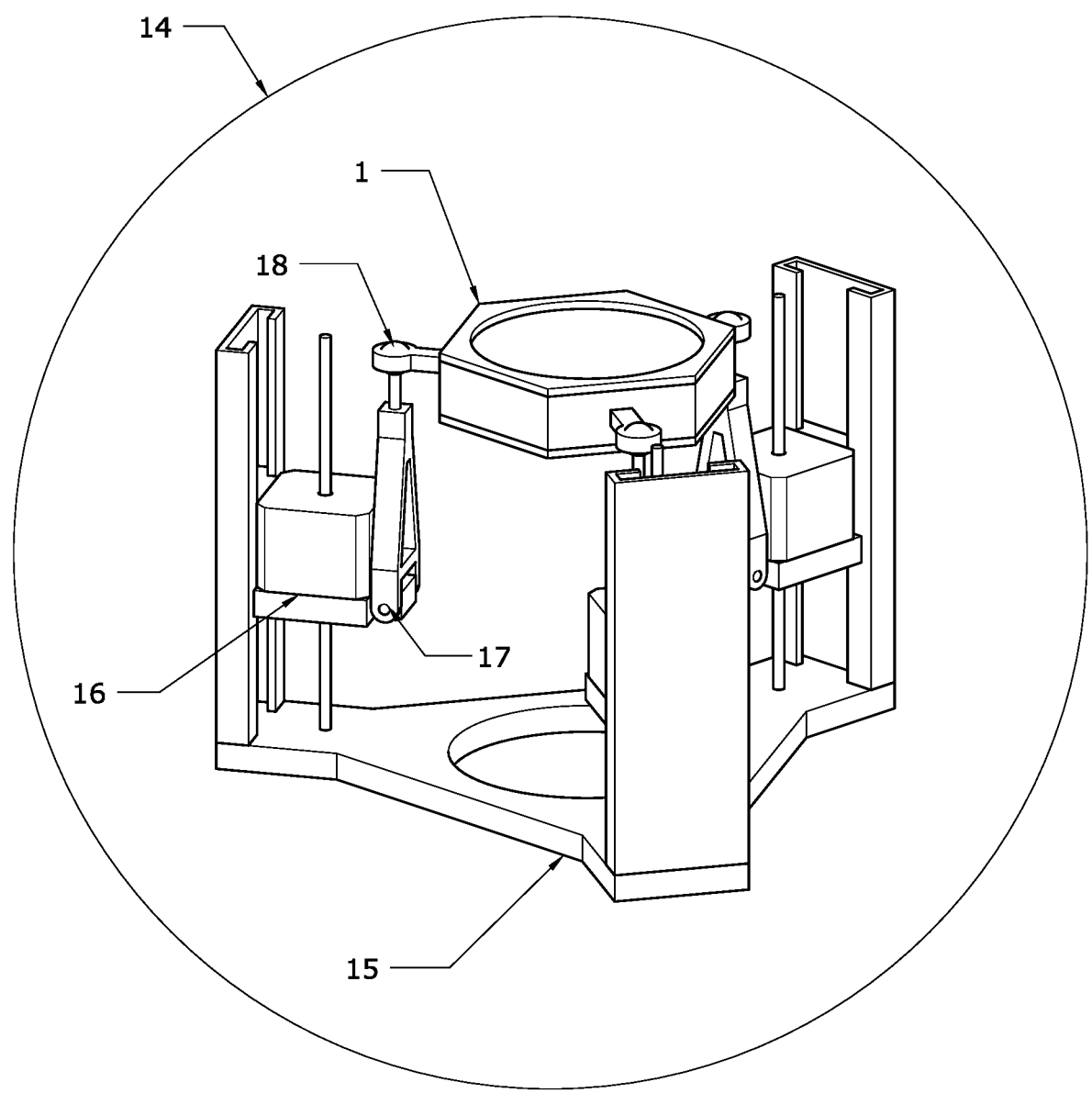
FIG. 5 is a general view of a weeding unit incorporating the weeding concentrator.
Figure 6:
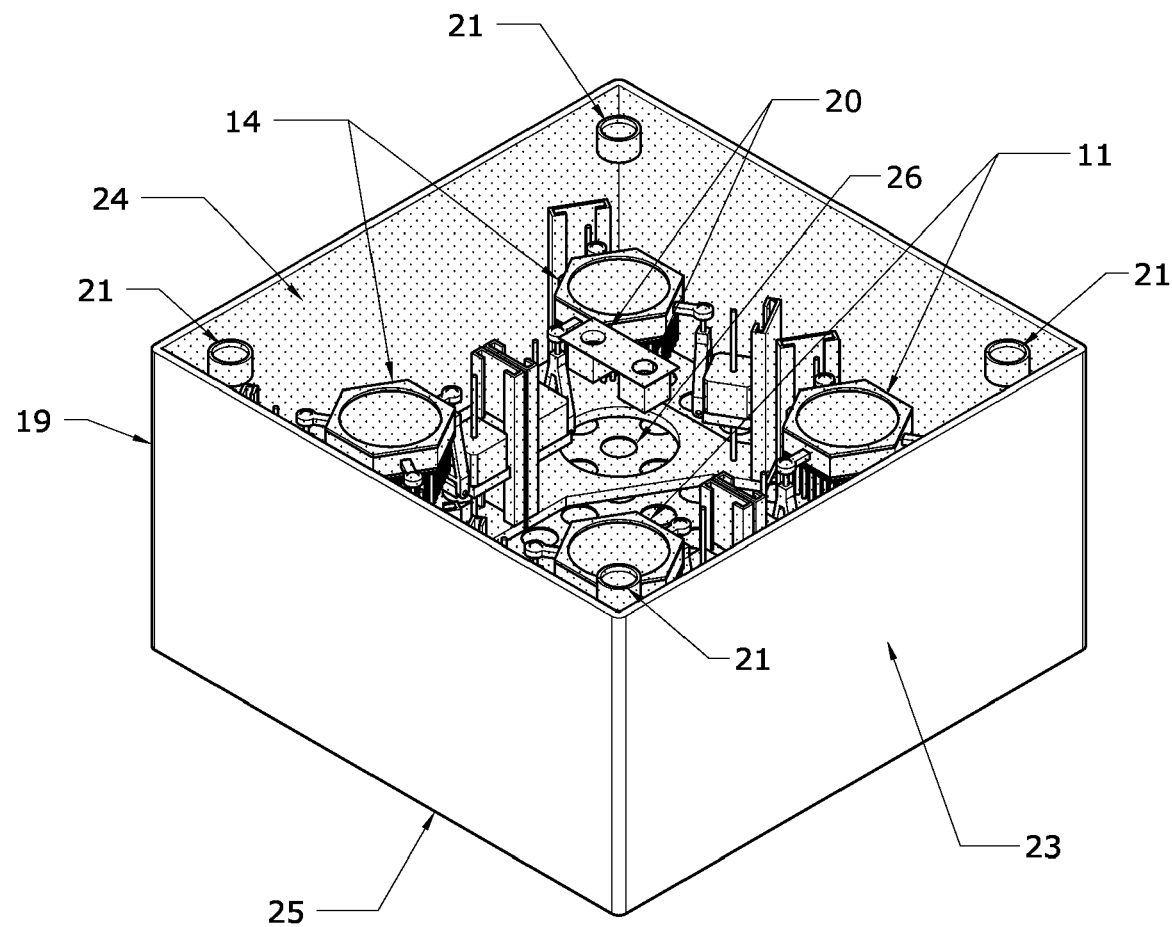
FIG. 6 is a general view of a weeding module, shown inverted, which incorporates four weeding units.
Figure 7:
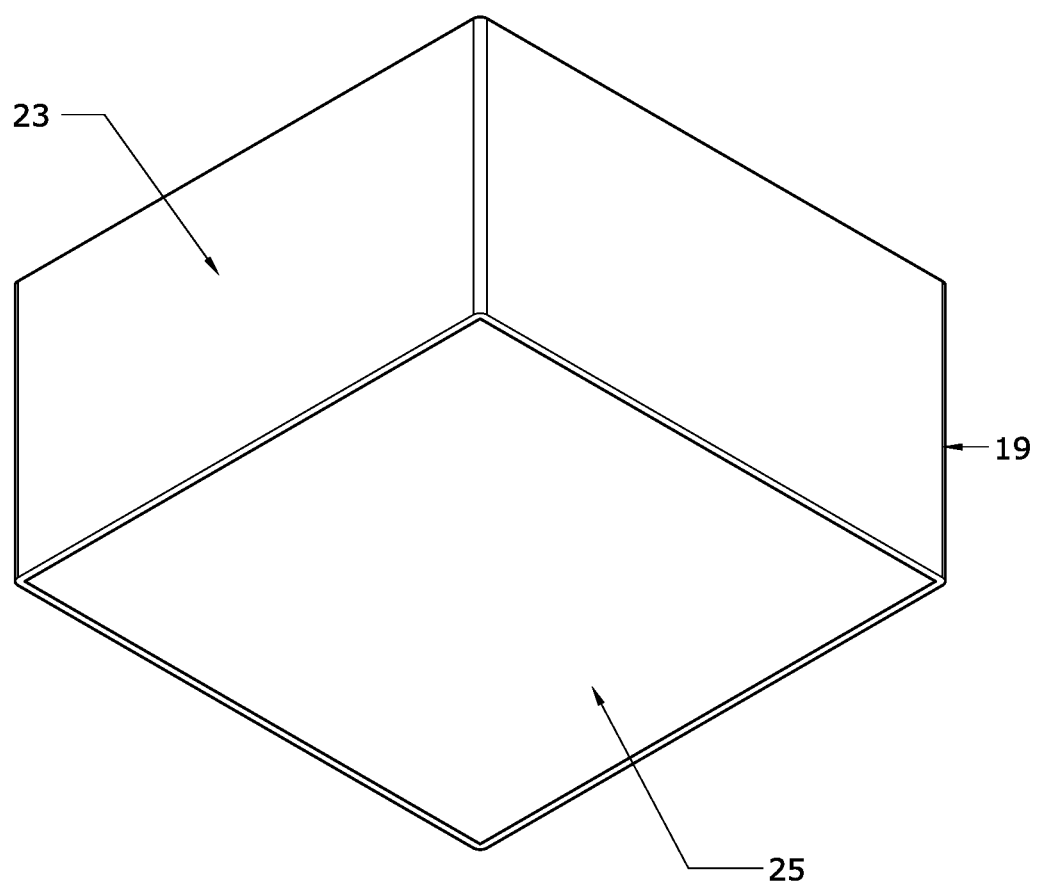
FIG. 7 is a general view of the inverted weeding module from beneath.
Figure 8:
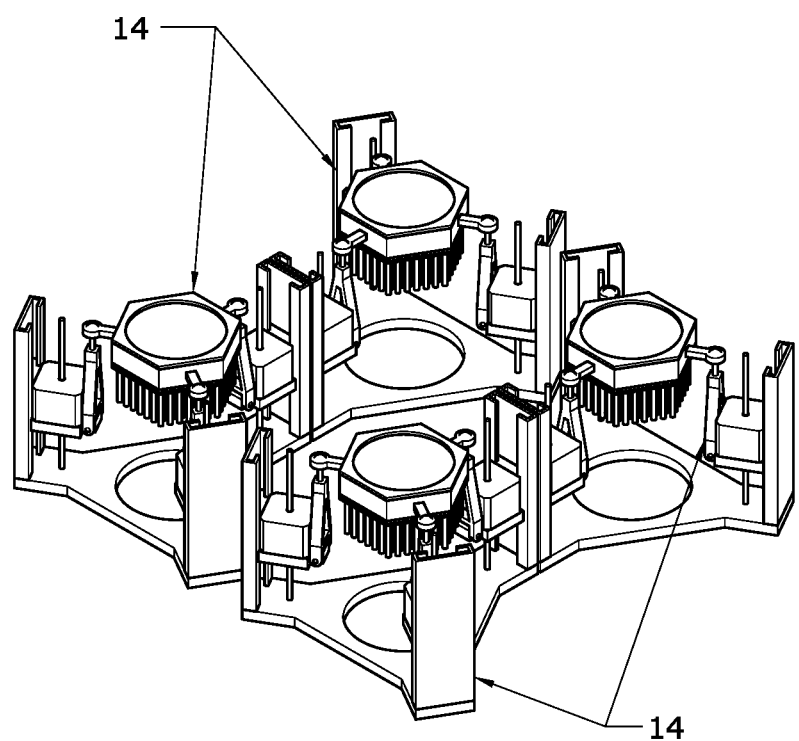
FIG. 8 is a general view of the internal components of the weeding module.
Figure 9:
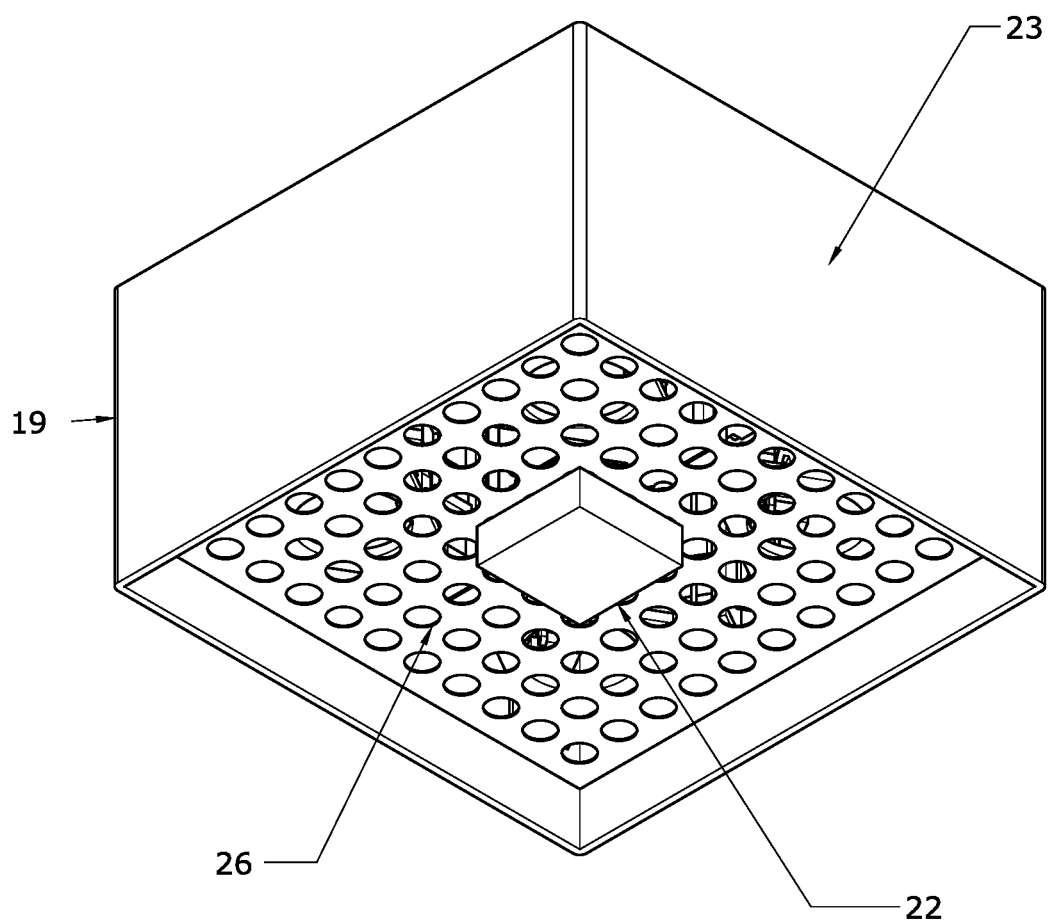
FIG. 9 is a similar view to FIG. 7 but showing more of the internal components of the weeding module.
Figure 10:
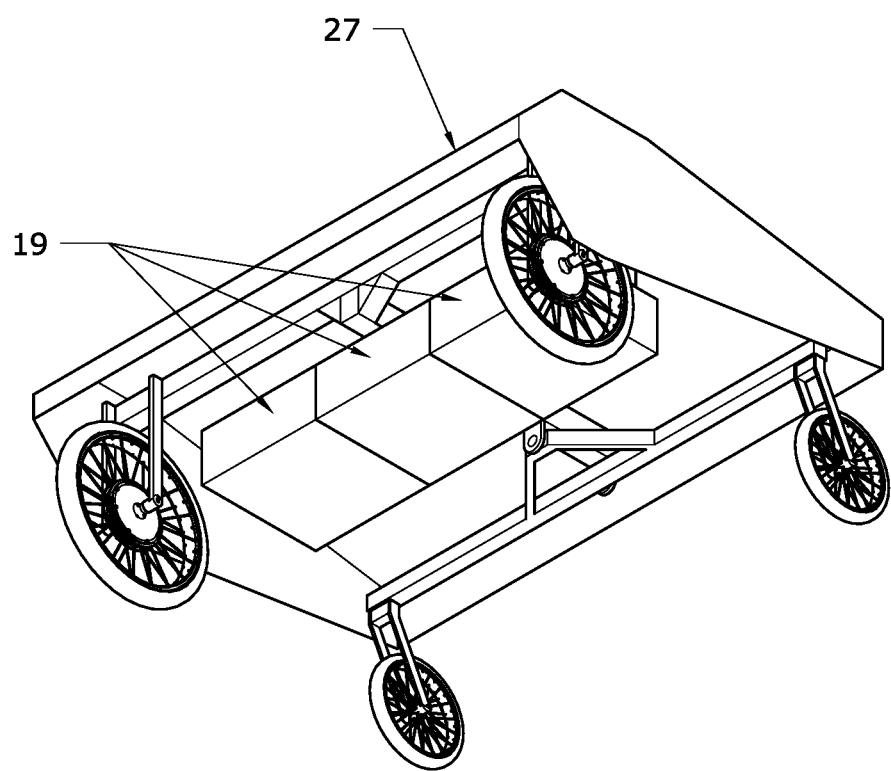
FIG. 10 is a general bottom view of an autonomous rover incorporating several such weeding modules.
Figure 11:
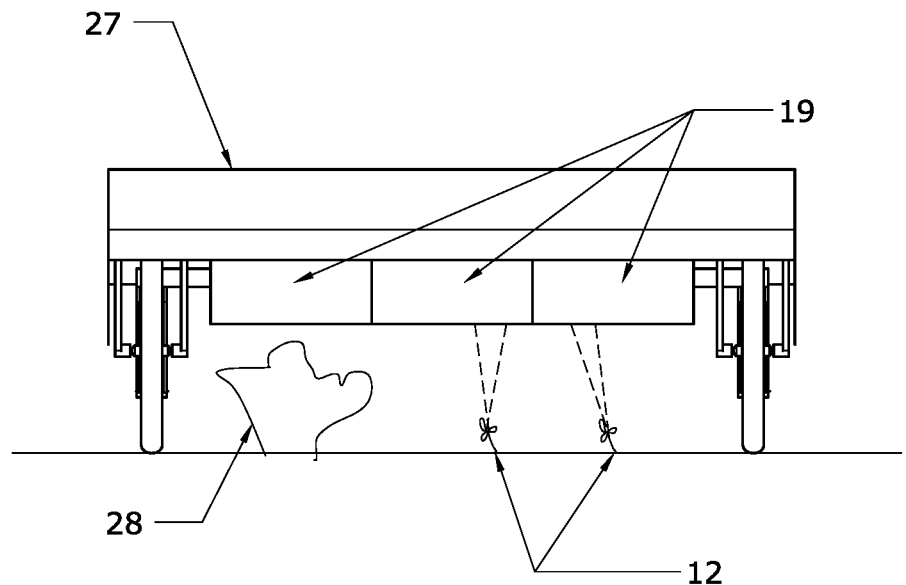
FIG. 11 is a rear view of the autonomous rover.
Figure 12:
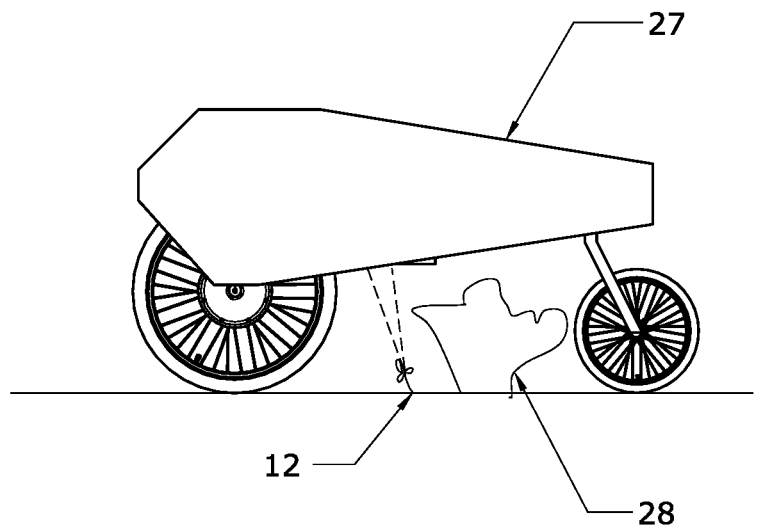
FIG. 12 is a side view of the autonomous rover.
Figure 13:
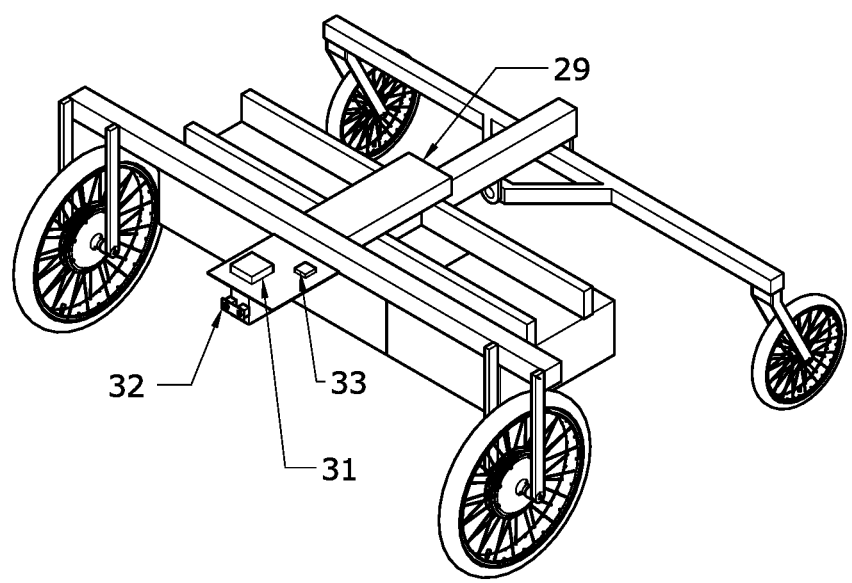
FIG. 13 is a general view of the internal chassis of the autonomous rover.

FIG. 5 depicts a weeding unit 14, which comprises a weeding concentrator 1 mounted on a 3 DOF robot 15, able to aim the weeding concentrator towards a weed and adjust the focal plane to the weed position.

A preferred embodiment based on a 3PRS robot is shown, having three actuated prismatic joints 16, three revolute (pivotal) joints 17 and three spherical joints 18, these connected to weeding concentrator 1.

Many other mechanical configurations are possible for the aiming robot 15; for instance, a 2 DOF robot, like parallel double cardan configuration or two motors serially gimballed, combined with a vertical prismatic actuator for focal plane adjustment, a 3DOF cartesian robot, etc. These are just some examples, and many other robot configurations are possible.

Referring to FIGS. 6-9, the weeding module 19, which is shown inverted for illustrative purposes, comprises several weeding units 14, arranged in a matrix, camera system 20, illumination system 21, control computer 22 and all necessary light and motor control electronics.

All the components are enclosed within a water and dust tight box having a central body 23 with walls joined together by rivets, screws, adhesive, welding or any other suitable assembly method. This box is closed on one side by transparent glass pane 24, shown with a dotted pattern, and on the opposite side by back plate 25. The glass pane 24 should be of high transmittance within the emission spectrum of semiconductor emitters 2.

Weeding units 14, control computer 22 and any additional power and control electronics are mounted on an intermediate plate 26.

Camera system 20 and illumination system 21 are directly attached to the internal side of the glass pane 24.

These figures show a weeding module that contains four weeding units, a stereo camera system and four illuminators, but many other possible combinations are feasible.

Control computer 22 is connected to camera system 20. Camera system 20 is preferentially a stereo RGB camera system with two imagers. In an alternative embodiment, a single imager can be supported by a lidar sensor. Control computer 22 is also connected with illumination system 21.

In FIGS. 10-13 several weeding modules 19 are mounted on an autonomous rover 27. The rover is configured to allow the weeding modules to be mounted at an appropriate height, leaving enough ground clearance to avoid physical interference between the weeding modules 19 and a crop 28.

Autonomous rover 27 is preferably an electric vehicle, powered by batteries 29 or alternatively by a fuel cell fed by compressed hydrogen. Solar panels 30 can be included for further carbon footprint reduction.

The vehicle includes a rover control computer 31 and several sensors that enable its autonomous operation: frontal stereo vision depth camera 32, IMU 33 and twin RTK receivers and antennae 34, which enable the rover to very accurately estimate its global position and heading. Rover computer 31 executes localisation algorithms using sensor fusion techniques to deliver a continuous global position estimate.

Frontal stereo camera 32 is used to detect and range any obstacles in the rover path. Object detection and classification preferably uses neural network algorithms, enabling the rover to automatically react depending on the mature of the obstacle. An alternative lidar sensor can also be used to obtain redundant depth measurements for a more robust solution.

Autonomous rover 27 accomplishes its weeding mission by executing the following steps in the stated sequence:

Step 1: The rover stops after having covered a specific distance, detecting and positioning the crop using its precise localisation system, stereo vision and deep learning algorithms. After stopping the rover, rover control computer 31 sends an activation signal and crop location information to all weeding modules 19.

Step 2: Each weeding module 19 uses its camera system 20 and illumination system 21 to take a nadir picture of a working area of ground below the module.

Step 3: These images are processed by each module computer 22 to detect all weeds within the working area. Module computer 22 preferably uses deep learning machine trained algorithms. When using a stereo camera system, the preferred method will detect weed centres on pictures coming from both imagers, then using a sparse stereo method for depth estimation.

Step 4: After eliminating crop positions provided by rover control computer 31 in step 1, each module computer 22 controls the several weeding units 14 to target the weeds and, when reaching the target, fires a short pulse of light at maximum power, killing or damaging the selected weed.

A preferred implementation of step 4 uses a visual servoing algorithm. This requires the control system to be able to generate two levels of power on weeding concentrator 1: a low power level to make the focal spot bright enough to be clearly segmented by computer vision algorithms, using this as a pointing beam, and a high power level to be used on a short pulse in order to deliver the amount of energy required to kill weeds. Module computer 22 uses camera system 20 for closed loop control by continuously detecting and monitoring the pointing beam motion. For each weed 12, when the pointing beam is detected to be on target, a short pulse of light at maximum power is fired, killing or damaging weed 12.

Step 5: This stage is optional. After each module has completed step 4, a second nadir picture and depth map may be obtained for each weeding module 19. All this information is sent to rover computer 31, which processes it to assess the success rate of the weed treatment. Rover computer 31 can eventually decide to order some of the weeding modules 19 to repeat step 4 and eliminate any remaining weeds.

A safety system may be implemented by using images from camera system 20, machine learning algorithms running on module control computer 22 would detect human, farm animal, pet or wildlife body parts when coming within target area of the weeding module 19. These algorithms can be trained to detect naked human body or animal parts, like feet, hands, legs, paws, etc. and clothed human body parts, like boots, sneakers, shoes, gloves, shirt sleeves, etc.

Figure 14:
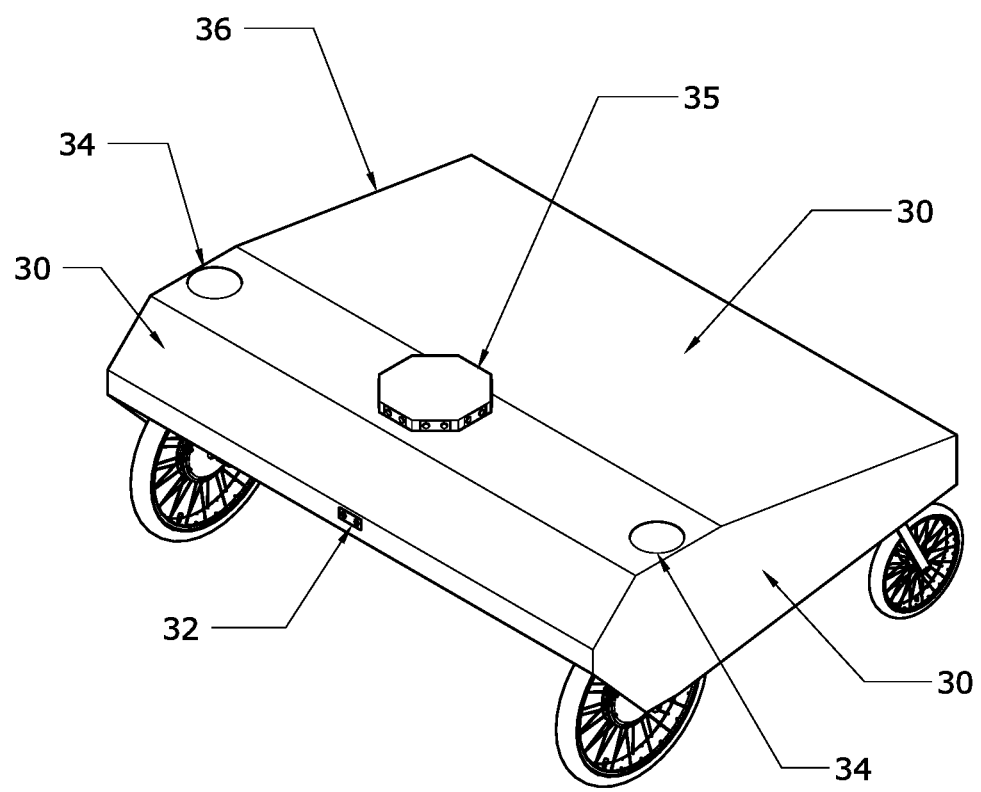
FIG. 14 is a general view of the autonomous rover showing an external modification.

FIG. 14 shows an additional active safety system for detecting any subjects that may become closer than the safety distance during weeder operation.

Using several additional stereo cameras 35, jointly covering 360 degrees of vision surrounding the rover, rover computer 31 can detect and range any sensitive subjects trespassing the safe distance threshold (virtual fencing). On that eventuality rover computer 31 will immediately disarm weeding modules 10 and will activate visual and acoustic warning signals. An optional 360° scanning lidar can be used to reinforce this function.

In this embodiment the rover bodywork 36 fulfills several functions: reinforced weather protection for rover components and weeding modules, a substrate onto which solar cells are laminated, collision energy absorption, and an additional passive safety system for the weeding concentrators.

Rover bodywork 36 is made of opaque or light diffusing material. It has a top cover composed by flat facets protruding before and after weeding modules 19, and vertical side walls.

High efficiency solar cells are laminated to bodywork 36, which should have mainly flat surfaces to optimize the efficiency of series connected solar cells.

Rover bodywork 36 is configured so that its shape minimizes the possibility of any accidental ground reflection affecting a subject closer than the design safety distance, and it can be designed to make it impossible that a direct reflection can reach an adult person of average height standing close to the rover.

These additional active and passive safety measures further enhance the inherent safety of the weeding concentrators.

Figure 15:
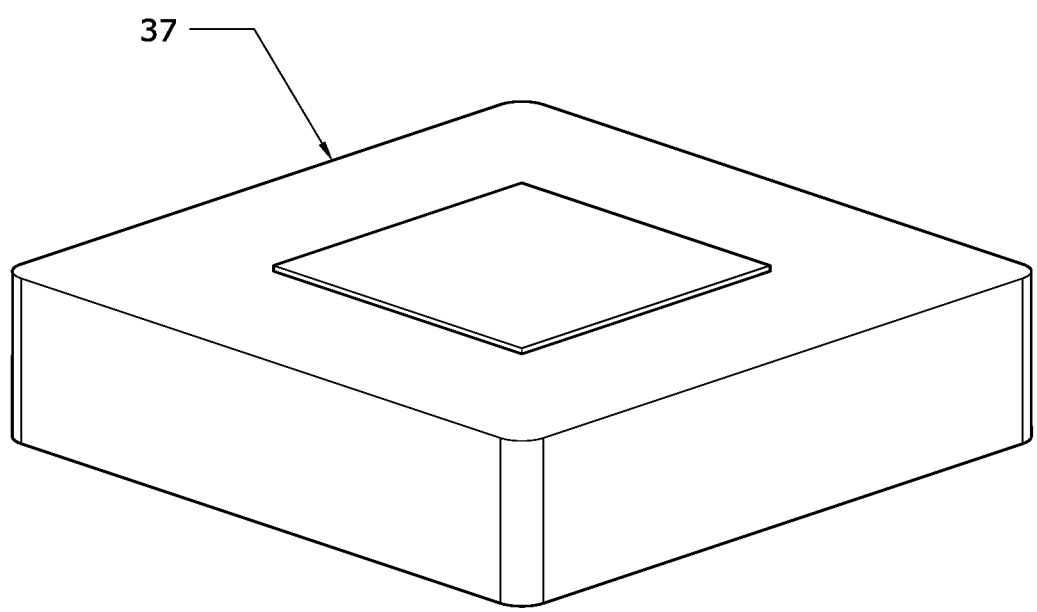
FIG. 15 is a general view of a modified weeding concentrator for use in hand-held weeding apparatus.
Figure 16:
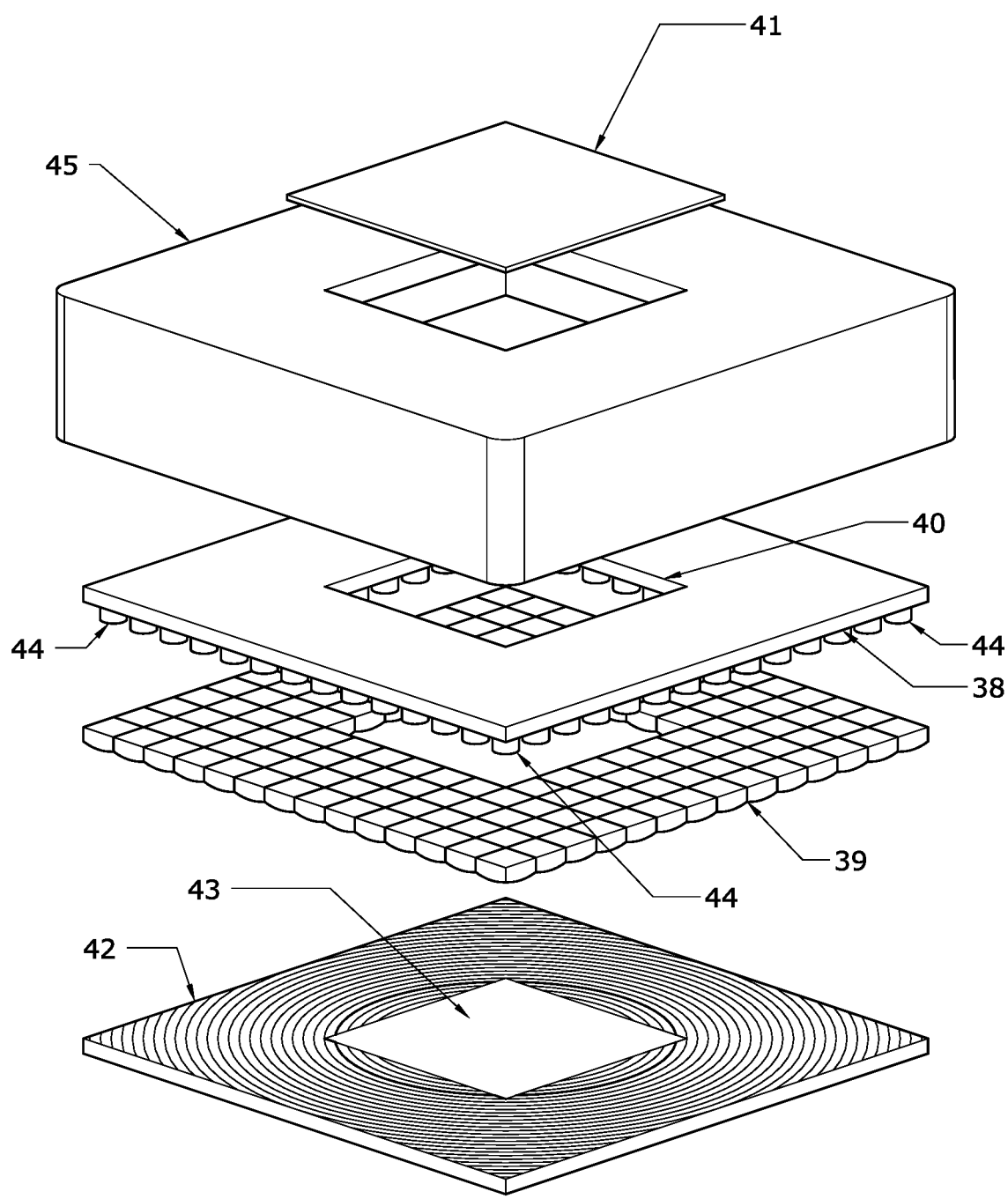
FIG. 16 is an exploded view of the modified weeding concentrator.

A second form of weeding concentrator 37, shown in FIGS. 15 and 16, is specially adapted to manual hand-held operation. Semiconductor emitters array 38 and primary optical stage 39 are arranged so that a central empty area is omitted, forming a visor cavity 40, on top of which a convenient selective filter 41 is mounted.

Selective filter 41 is designed to block light having wavelengths close to those generated by semiconductor emitters array 38, for instance to block light at wavelengths close to 450 nm, but not to block light at other wavelengths.

Secondary optical stage 42 is configured as a Fresnel lens having an unstructured flat central area 43, matching the position and dimensions of visor cavity 40, in such way as to allow a human operator to see through the device aiming at the working area below weeding concentrator 37.

Secondary optical stage 42 will be designed to have a low F number (focal length to aperture ratio), such that the safety distance is shortened.

This manual system is operated thanks to at least three aiming laser diodes 44 preferentially placed in the periphery of semiconductor emitters array 38.

Aiming laser diodes 44 are chosen to emit in a different wavelength to that of semiconductors emitter array 38, for instance red laser diodes emitting at 700 nm, in such a way as to avoid the selective filter 41 blocking their reflections.

All these components are mechanically held by body 45, comprising a watertight enclosure together with selective filter 41 and secondary optical stage 42.

Figure 17:
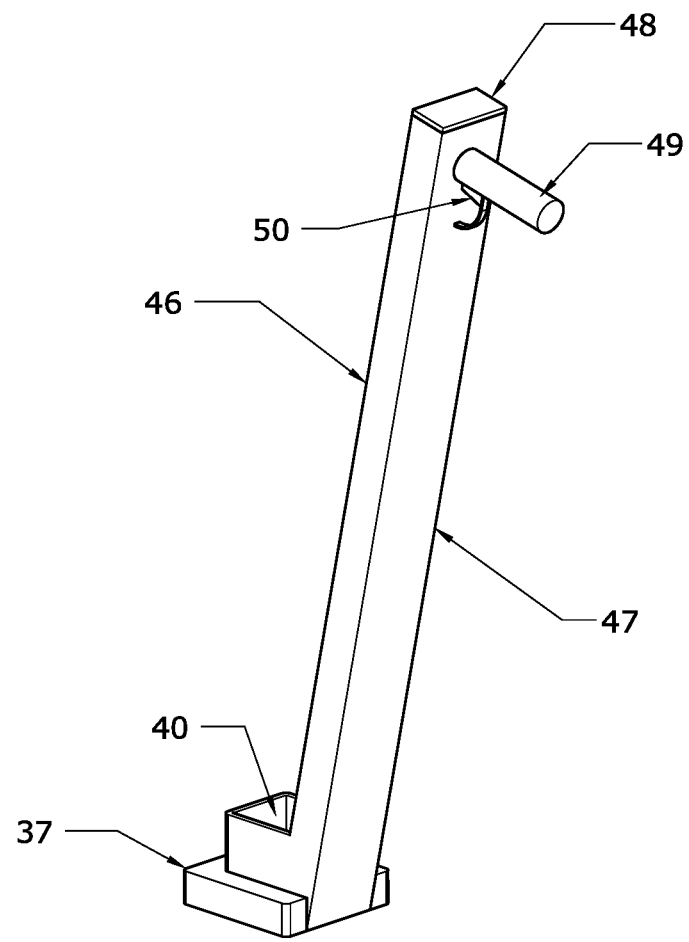
FIG. 17 is a general view of hand-held weeding apparatus incorporating the modified weeding concentrator.
Figure 18:
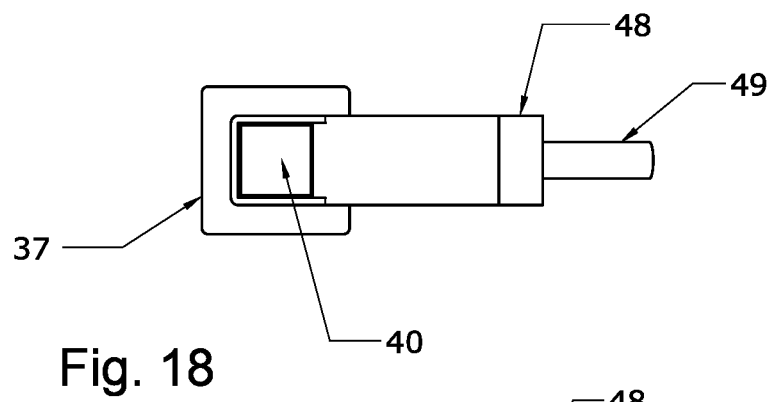
FIG. 18 is a top view of the hand-held weeding apparatus.
Figure 19:
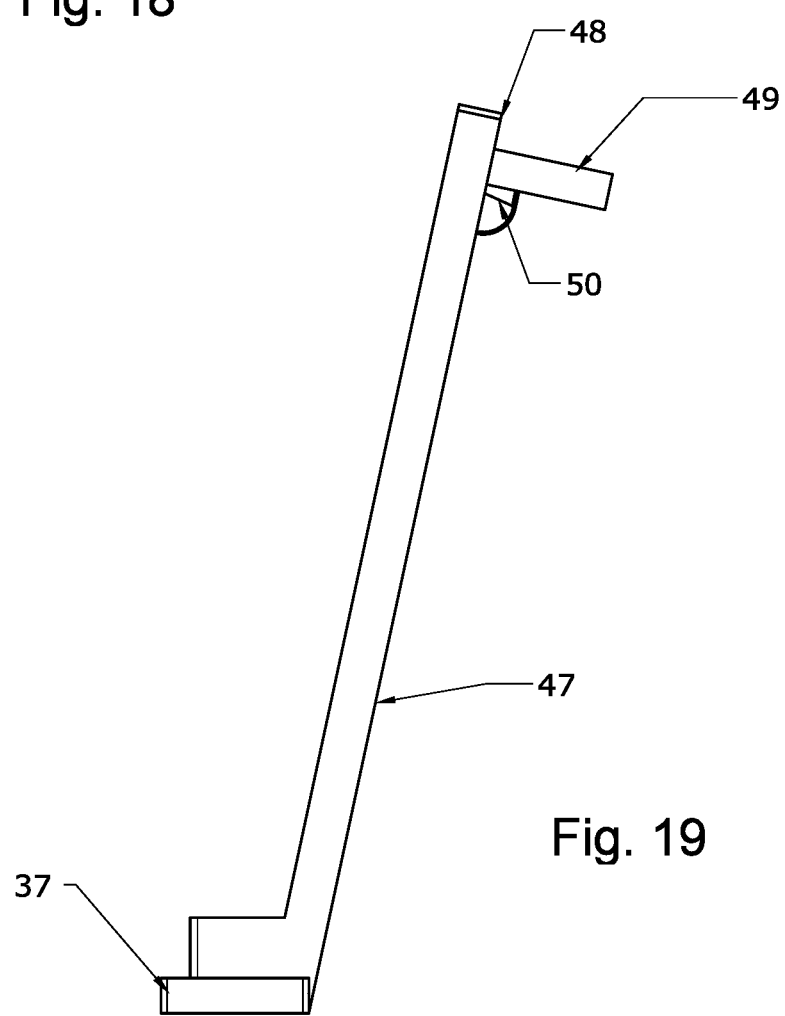
FIG. 19 is a side view of the hand-held weeding apparatus.

FIGS. 17-19 show a manual weeding tool 46 in which the weeding concentrator 37 is mounted on a support stick 47 hand held by an operator. Handheld stick 47 contains at least one battery and drive electronics 48 powering weeding concentrator 37. To use the tool, the operator grasps a handle 49 and fires the device using a trigger 50.

Figure 20:
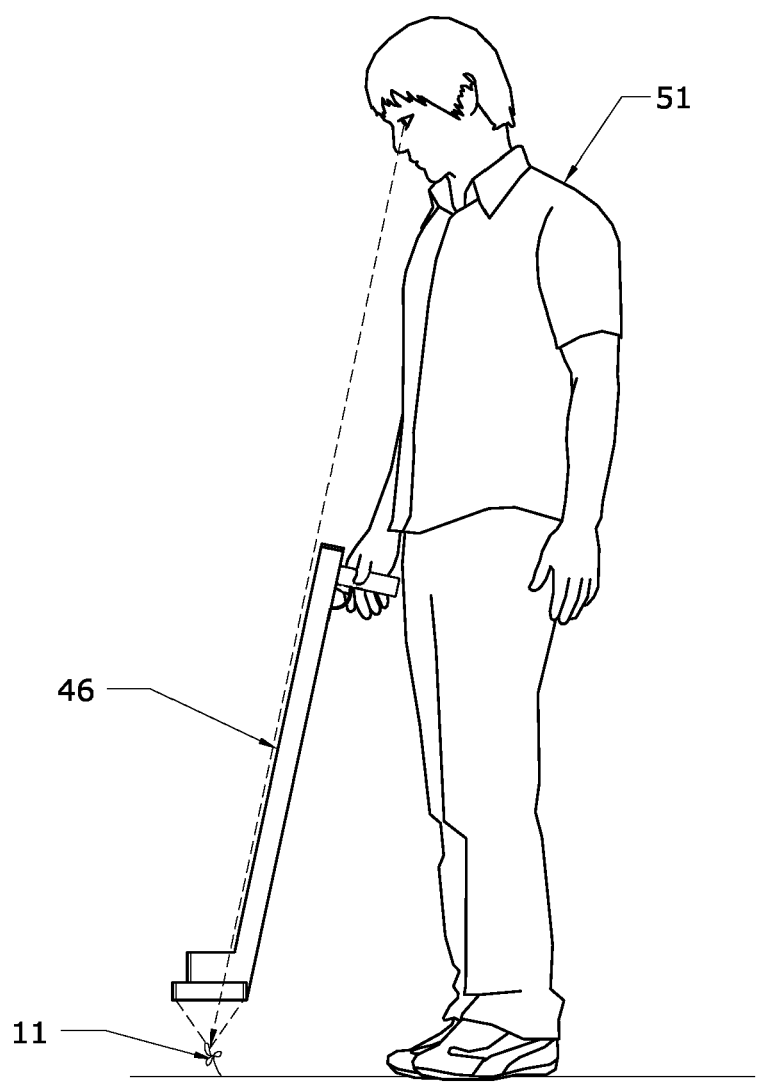
FIG. 20 is a diagrammatic representation of the hand-held weeding apparatus in use.

FIG. 20 depicts operation of manual weeding tool 46. Using the aiming laser diodes 44, the operator 51, looking through visor cavity 40, can see at least three convergent laser dots which converge on target weed 11 when target weed 11 is in focus.

When target weed 11 is not on the focal plane of secondary optical stage 42, at least three laser dots not convergent on target weed 11 will be visible.

When target weed 11 is viewed by operator 51 to be on target and on focus, operator 51 triggers a high power concentrated light pulse by depressing trigger 50.

The invention claimed is:

1. A weeding apparatus comprising a concentrator assembly (1) having:
    a two-dimensional array of discrete semiconductor light emitters (2);
    a primary optical stage (3) comprising a plurality of collimating lenses (4) each corresponding to one of said semiconductor light emitters (2) to collimate light therefrom whereby the primary optical stage is operable to produce a compound collimated beam (10);
    a secondary optical stage (5) which incorporates a lens system arranged to convert the compound collimated beam (10) into a convergent beam (11) to concentrate the emitted light at a focal position;
wherein the semiconductor light emitters (2) are light emitting diodes;
wherein the compound collimated beam (10) produced by the primary optical stage (3) passes directly to the secondary optical stage (5) without any intervening lens system;
the weeding apparatus being arranged such that the concentrator assembly (1) can be moved to direct the focal position onto a selected plant to be damaged by light which is thereby concentrated thereon.

2. The weeding apparatus according to claim 1 wherein each light emitting diode is configured to shape the light emitted by said light emitting diode into a cone of light with a defined angular divergence preceding the primary optical stage (3).

3. The weeding apparatus according to claim 1 wherein the concentrator assembly (1) is incorporated in a weeding unit (14) which includes a mechanical drive arrangement (15) configured to move the concentrator assembly in such a way that the convergent light beam (11) is directed towards a selected plant.

4. The weeding apparatus according to claim 3 wherein the mechanical drive arrangement (15) is configured to move the concentrator assembly in such a way that the focal position of the convergent light beam is adjusted to impinge on the selected plant.

5. The weeding apparatus according to claim 3 wherein the distance of the secondary optical stage (5) from the primary optical stage (3) is adjustable to change the focal position of the convergent light beam (11) whereby the focal position is moved to impinge on the selected plant.

6. The weeding apparatus according to claim 1 wherein the semiconductor light emitters (2) are operable at a low power setting for aiming the focal position of the light beam onto a plant and a high power setting for damaging the plant.

7. The weeding apparatus according to claim 6 wherein, in the high power setting, the semiconductor light emitters (2) are configured to emit light in a pulsed manner.

8. The weeding apparatus according to claim 1 which includes a weeding module (19) having:
    a plurality of weeding units (14) each incorporating a concentrator assembly (1) and a mechanical drive arrangement (15) configured to move the concentrator assembly in such a way that the convergent light beam (11) is directed towards a selected plant;
    a detector system (20) to determine the spatial position of a plant which is selected to be killed or damaged;
    a control system (22) configured to control the mechanical drive arrangements (15) of the weeding units (14) to direct the convergent light beams (11) towards the selected plant.

9. The weeding apparatus according to claim 8 wherein the detector system (20) comprises an imaging system for capturing plant images.

10. The weeding apparatus according to claim 9 wherein the detector system (20) comprises stereo imaging devices and the control system (22) is configured to process the stereo images from the imaging devices to identify unwanted plants and determine their spatial positions for targeting by the weeding units (14).

11. The weeding apparatus according to claim 9 wherein the weeding module (19) includes an illumination system (21) for use with the imaging system.

12. The weeding apparatus according to claim 8 wherein the detector system (20) includes a lidar sensor.

13. The weeding apparatus according to claim 8 wherein the weeding units (14), the detector system (20) and the control system (22) are sealed within a box (23) having a light-transmitting window (24).

14. The weeding apparatus according to claim 8 wherein the control system (22) of the weeding module (19) is configured to execute the following steps in the sequence stated:
    (i) store the spatial positions of wanted plants comprised in a crop;
    (ii) use the detector system (20) to image a working area of ground;
    (iii) process the image to select unwanted plants within the working area and determine their spatial positions;
    (iv) target the concentrator assemblies (1) onto the selected plants within the working area and operate the concentrator assemblies to damage the unwanted plants using concentrated light;
    (v) optionally record a second image of said working area of ground using the detector system (20).

15. The weeding apparatus according to claim 8 wherein a plurality of such weeding modules (19) are contained within an autonomous vehicle (27).

16. The weeding apparatus according to claim 1 wherein the concentrator assembly (1) is mounted within a hand-held device having a handle (49) and an operating trigger (50).

17. The weeding apparatus according to claim 1 wherein the safety distance d calculated using the formula $$d = f\sqrt{i_1/i_2}$$

is less than 1.78 m, where:
i1 is the irradiance level of light reaching the secondary optical stage in W/m2
i2 is 1,000 W/m2
f is the focal length of the secondary optical stage.

18. A weeding apparatus comprising a concentrator assembly (1) having:
- a two-dimensional array (39) of discrete semiconductor light emitters (2);
- a primary optical stage (39) comprising a plurality of collimating lenses (4) each corresponding to one of said semiconductor light emitters (2) to collimate light therefrom whereby the primary optical stage is operable to produce a compound collimated beam (10);
- a secondary optical stage (42) which incorporates a lens system arranged to convert the compound collimated beam (10) into a convergent beam (11) to concentrate the emitted light at a focal position;

wherein the concentrator assembly (1) is mounted within a hand-held device having a handle (49) and an operating trigger (50) such that the concentrator assembly (1) can be moved to direct the focal position onto a selected plant to be damaged by light which is thereby concentrated thereon;

wherein the two-dimensional array (39) of discrete semiconductor light emitters and the primary and secondary optical stages (39 and 42) surround a central cavity (40), a viewing filter (41) is mounted over the cavity to block light emitted by the light emitter array (39), and a plurality of semiconductor light-emitting aiming devices (44) which emit light in a different wavelength from that of the semiconductor emitter array (39) form aiming marks which converge at said focal position.

\* \* \* \* \*